United States Patent [19]

Staton

[11] Patent Number: 5,533,130

[45] Date of Patent: Jul. 2, 1996

[54] COSMETICALLY DISGUISED HEARING AID

[76] Inventor: Ed Staton, 1929 Lakeshore Dr., Hot Springs, Ark. 71913

[21] Appl. No.: 290,520

[22] Filed: Aug. 15, 1994

[51] Int. Cl.⁶ .............................. H04R 25/00; G02C 5/14
[52] U.S. Cl. .............................. 381/68.5; 381/68; 381/69; 351/111; 181/129
[58] Field of Search .................... 381/68, 68.2, 68.4, 381/69, 69.2, 68.5, 68.6, 68.7; 181/126, 129, 130, 134, 135; D24/174; 351/111, 123

[56] References Cited

U.S. PATENT DOCUMENTS

| | | | |
|---|---|---|---|
| 2,477,046 | 7/1949 | Davenport | 179/107 |
| 2,595,672 | 5/1952 | Greenwood | 41/34 |
| 2,856,466 | 10/1958 | Gustafson et al. | 179/107 |
| 2,909,619 | 10/1959 | Hollingsworth | 381/68.3 |
| 3,244,819 | 4/1966 | Sapara | 179/107 |
| 3,536,861 | 10/1970 | Dunlavy | 179/107 |
| 3,588,384 | 6/1971 | Negley | 179/156 |
| 3,665,121 | 5/1972 | Weiss | 179/107 |
| 3,789,163 | 1/1974 | Dunlavy | 179/107 |
| 3,809,829 | 5/1974 | Vignini et al. | 179/107 |
| 3,825,700 | 7/1974 | Jerry et al. | 179/107 |
| 4,451,709 | 5/1984 | Waxman | 179/107 |
| 4,736,430 | 4/1988 | Schröder | 381/68.6 |
| 4,803,853 | 2/1989 | Hoerkens | 63/14.1 |
| 4,888,805 | 12/1989 | Karppala, Jr. | 381/25 |
| 5,159,639 | 10/1992 | Shannon et al. | 381/68.5 |

Primary Examiner—Forester W. Isen
Assistant Examiner—Xu Mei
Attorney, Agent, or Firm—Stephen D. Carver; Trent C. Keisling

[57] ABSTRACT

A hearing aid designed to be affixed to a pair of eyeglasses used by the wearer or suspended from an ear mold that is lodged in the ear of the wearer is disclosed. The hearing aid is cosmetically disguised and may be worn by either males or females. The hearing aid comprises a hemispherically shaped ornamental outer shell that covers all of the components and circuitry of a conventional hearing aid. The hearing aid components are housed inside a casing. Preferably, the hearing aid uses a rotatable clasp to mount to the wearer's eyeglass frames or earlobe. In an alternative embodiment, the hearing aid does not mount to the wearer's eyeglasses. In a first preferred embodiment, a clasp secures the hearing aid to the wearer's eyeglasses. In a second preferred embodiment, a clip mounts the hearing aid to the wearer's eyeglass frames. In a third preferred embodiment, a cable tie mounts the hearing aid to the eyeglass frames through width adjustment slots in a projecting tab. A volume control knob, tone controls, battery access door and a rotatable clasp or deflectable clip protrude from the rear surface of the casing. The outer shell gives the hearing aid the appearance of an earring or an eyeglass tether mount. The outer shell of my hearing aid may be quickly exchanged with any of several other ornamental shells to give the earring or eyeglass tether mount the desired coloration and shape.

19 Claims, 9 Drawing Sheets

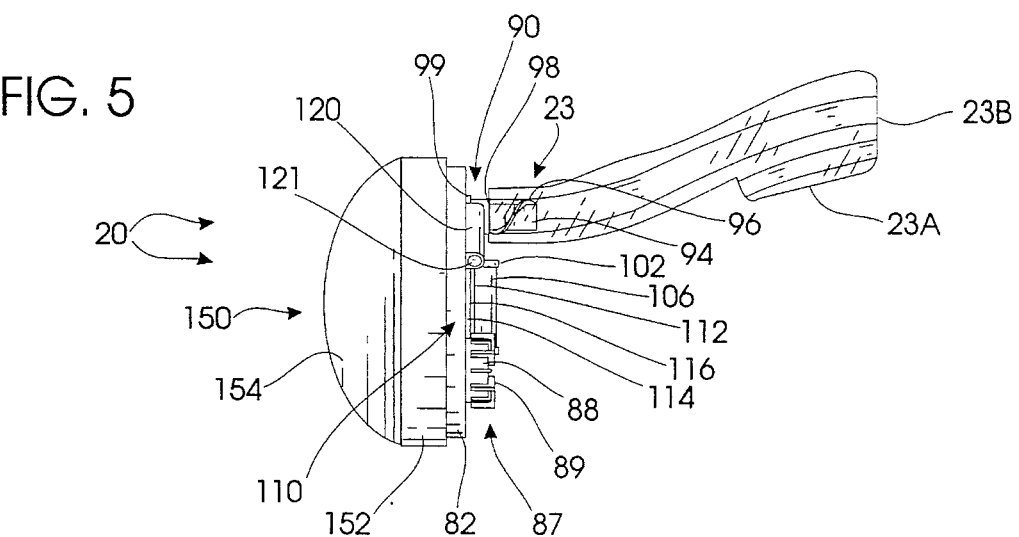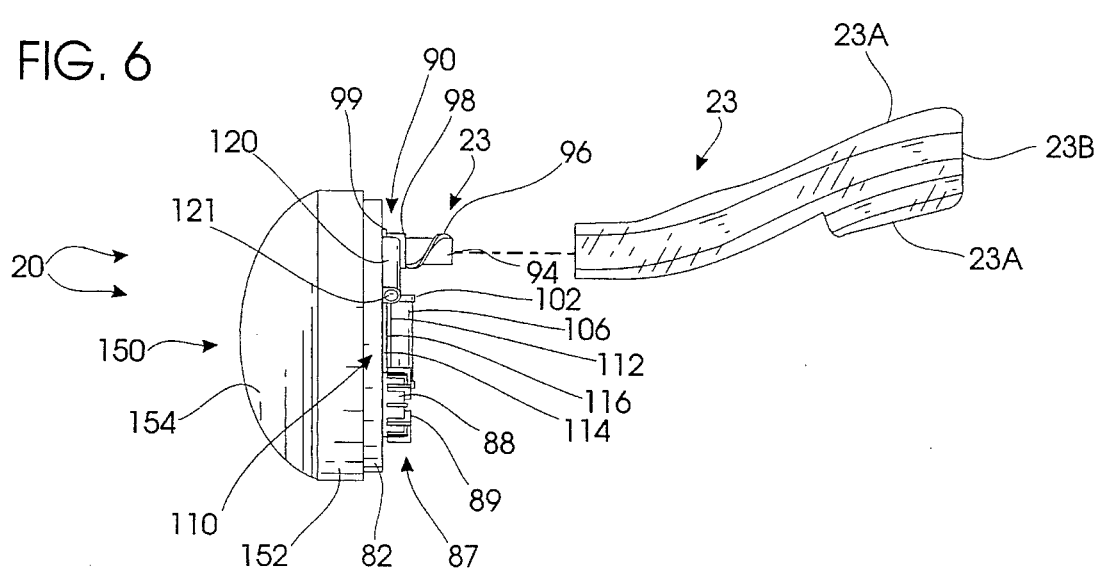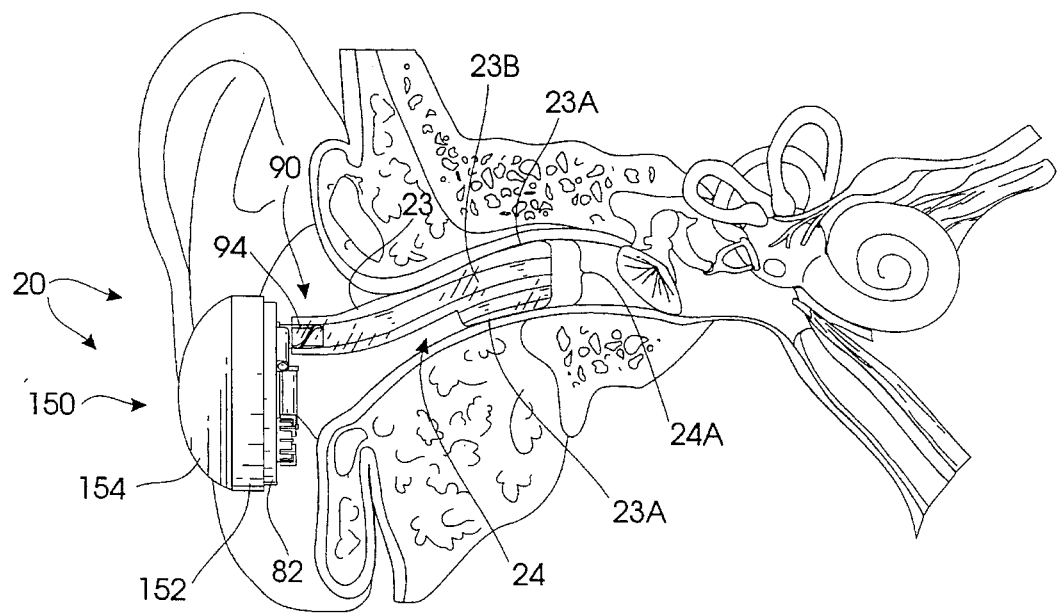

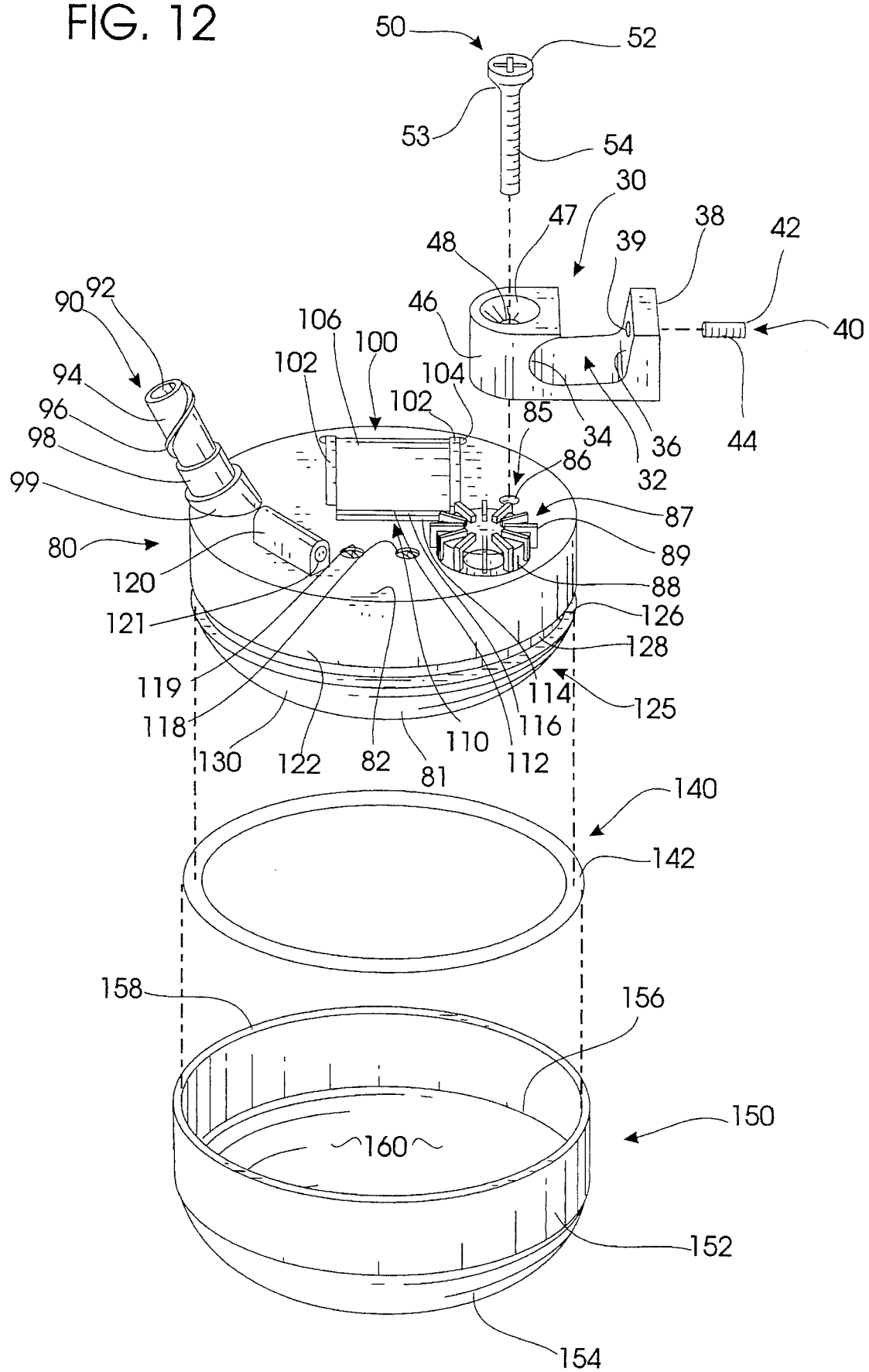

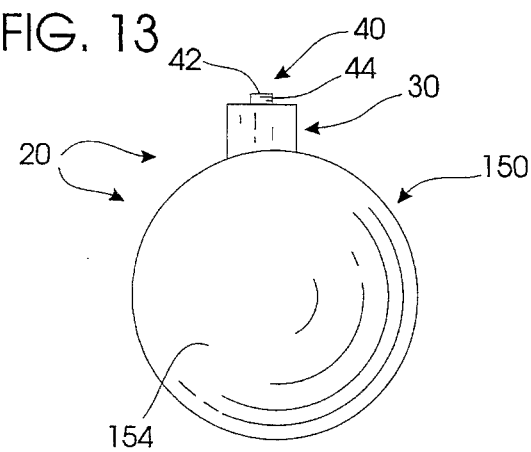
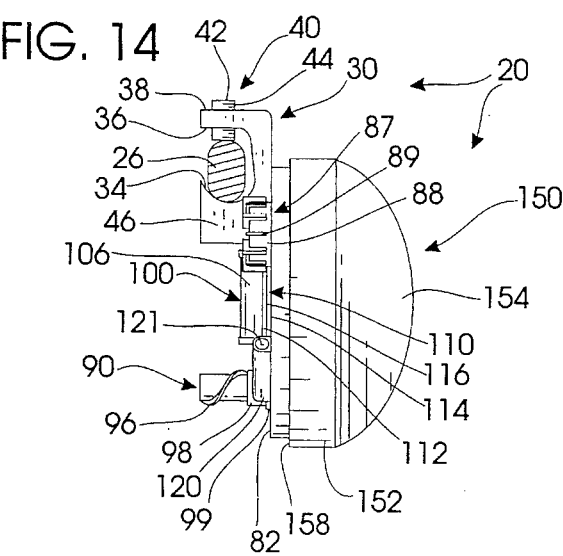
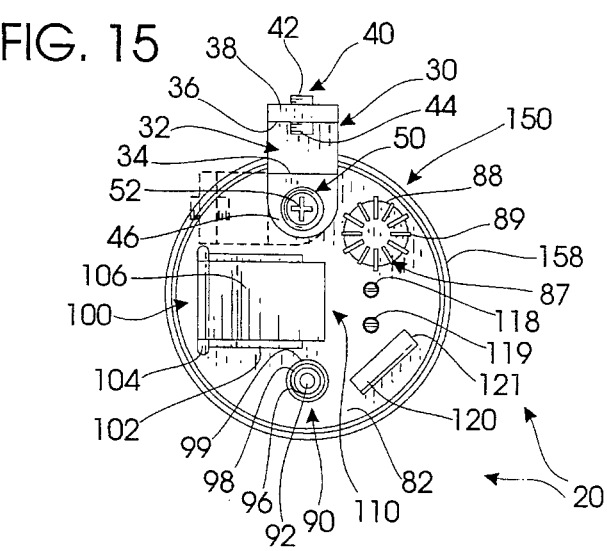
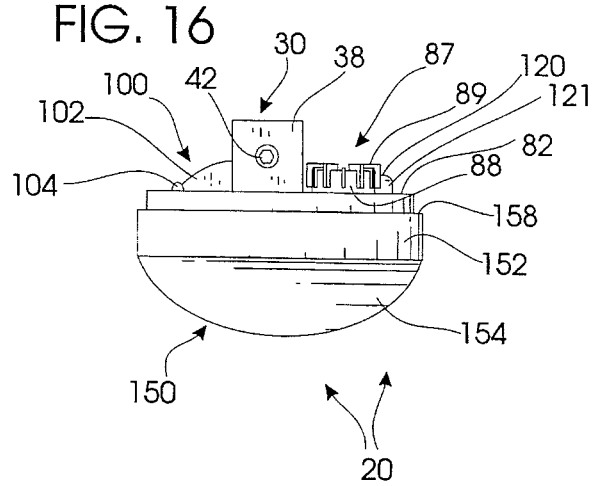
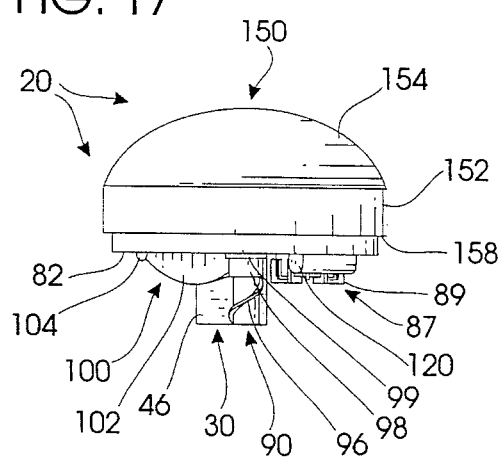

COSMETICALLY DISGUISED HEARING AID

BACKGROUND OF THE INVENTION

1. Field of the Invention

The present invention relates generally to hearing aids that are cosmetically disguised. More particularly, the present invention relates to a hearing aid that attaches either to an ear mold lodged in the ear canal or the eyeglasses of the wearer and is esthetically hidden by an ornamental, exterior shell. Known relevant prior art hearing aids are classified in U.S. Pat. Class 181, Subclasses 126 and 131, and Class 381, Subclasses 23.1, 150, 68–69, and 187.

2. Description of the Prior Art

As will be recognized by those skilled in the art, most wearers of hearing aids desire them to be cosmetically unobtrusive and/or hidden from view. Over the years, advancing technology has miniaturized the size of the individual components of the hearing aid and the corresponding size of the necessary housing. Thus, hearing aids have become progressively smaller with time. Modern acrylics used in hearing aid construction disguise the hearing aid by using flesh tones. A variety of shapes can be conveniently produced to further camouflage modern hearing aids.

Several prior art devices have attempted to hide the hearing aid by placing it outside or behind the wearer's ear. Other prior art devices hide the hearing aid by placing it inside a pair of eyeglasses. Such approaches are typified by U.S. Pat. Nos. 3,789,163, 3,244,819, 3,536,861, 3,853,393, 3,665,121, 4,451,709, 3,825,700, and 3,809,829. In these devices, the hearing aid is placed inside the eyeglass frame and a sound tube extends from the eyeglasses into the ear of the wearer.

Another approach utilizing the wearer's eyeglasses mounts the hearing aid on the frame exterior. U.S. Pat. Nos. 3,588,384, 5,159,639, 2,856,466 and 4,888,805 utilize this method. Both of these approaches may be used on any type of eyeglasses and are suitable for both male and female hearing aid users.

The hearing aid may also be disguised as an earring. U.S. Pat. Nos. 2,477,046, 2,595,672, and 4,736,430 house some of the hearing aid components inside a false earring. In these patents, an ornamental outer setting at least partially covers the hearing aid, disguising the covered portion as an earring. However, only the first two provide some form of an interchangeable exterior setting to coordinate to the wearer's desires.

Another interesting attempt at hiding the hearing aid may be seen in U.S. Pat. No. 4,803,853, wherein the hearing aid is covered by an ornamental mesh. The mesh covered hearing aid fits inside the wearer's ear.

However, the known prior art fails to provide a hearing aid that may be placed on either the eyeglasses or in the ear canal of the wearer. Another advantage lacking in the prior art is an interchangeable ornamental setting or shell that cosmetically houses all of the hearing aid components to completely disguise the hearing aid. Therefore it is desirable to provide a hearing aid that may used by either a male or female wearer and which may be placed in the ear canal or upon the eyeglasses of the wearer. It is also desirable that the hearing aid facilitate the use of multiple interchangeable ornamental, exterior shells quickly and efficiently.

SUMMARY OF THE INVENTION

I have designed a hearing aid that is adapted to be affixed to a pair of eyeglasses used by the wearer or suspended an ear mold placed in the ear of the wearer. My hearing aid is cosmetically disguised and may be worn by either males or females.

In several preferred embodiments my hearing aid may be optionally suspended from the wearer's ear or transformed to depend from the wearer's glasses. In one form of the invention my hearing aid mounts a rotatable clasp that may either be mounted to the wearer's eyeglass frames, or rotated out of the way to a hidden, inoperative retracted position. In an alternative embodiment, the hearing aid does not mount to the wearer's eyeglasses.

In a first preferred embodiment, a clasp secures the hearing aid to the wearer's eyeglasses. When the hearing aid is disguised as an earring, the clasp rotates to an inoperative, hidden position. In a second preferred embodiment, a clip mounts the hearing aid to the wearer's eyeglass frames. When the hearing aid is used as an earring, the clip resides within a recessed cavity in the casing. In a third preferred embodiment, a cable tie mounts the hearing aid to the eyeglass frames. The cable may be removed to use the hearing aid as an earring.

A volume control knob, tone controls, battery access door and a rotatable clasp or clip protrude from the rear surface of the casing for easy user access.

The hearing aid comprises a hemispherically shaped, ornamental outer setting or shell that snugly covers the conventional hearing aid circuitry housed entirely within the casing. The outer shell gives the hearing aid the appearance of an earring or an eyeglass tether mount. The outer shell of my hearing aid may be quickly exchanged with any of several other ornamental exterior shells. Preferably, these multiple interchangeable outer shells permit the wearer to discriminatingly choose or coordinate the desired "look" of the hearing aid.

Thus a primary object of the present invention is to provide a hearing aid that may be optionally placed upon the wearer's glasses or in the wearer's ear.

A primary object is to provide eyeglass mounting arrangements for hearing aids that may optionally be concealed or withdrawn from view.

Another basic object of the present invention is to provide a hearing aid having its components housed inside one casing.

A related object of the present invention is to provide a hearing aid that is cosmetically acceptable and that may be worn by either a male or female.

Another related object of the present invention is to promote the self-esteem of the wearer.

A basic object of the present invention is to provide a unisex hearing aid which may be worn by either males or females.

A related object of the present invention is to provide a hearing aid having an ornamental outer shell which may be readily exchanged with other outer shells.

A related object of the present invention is to provide a hearing aid which is simple to use and which may be easily manipulated by the user.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 5 is a right side elevational view showing an alternative embodiment of the hearing aid;

FIG. 6 is an exploded view similar to FIG. 5 showing the ear piece detached from the hearing aid;

FIG. 7 is an enlarged sectional view taken generally along line 7—7 of FIG. 1;

FIG. 12 is an exploded isometric view of an alternative embodiment;

FIG. 13 is a front plan view of the apparatus of FIG. 8;

FIG. 14 is an enlarged, partially sectional view taken generally along line 14—14 of FIG. 3;

FIG. 15 is a rear plan view of the embodiment of FIG. 8, with dashed lines indicating a moved position of the rotatable clasp;

FIG. 16 is a top plan view thereof;

FIG. 17 is a bottom plan view thereof;

DETAILED DESCRIPTION

Figure 1:
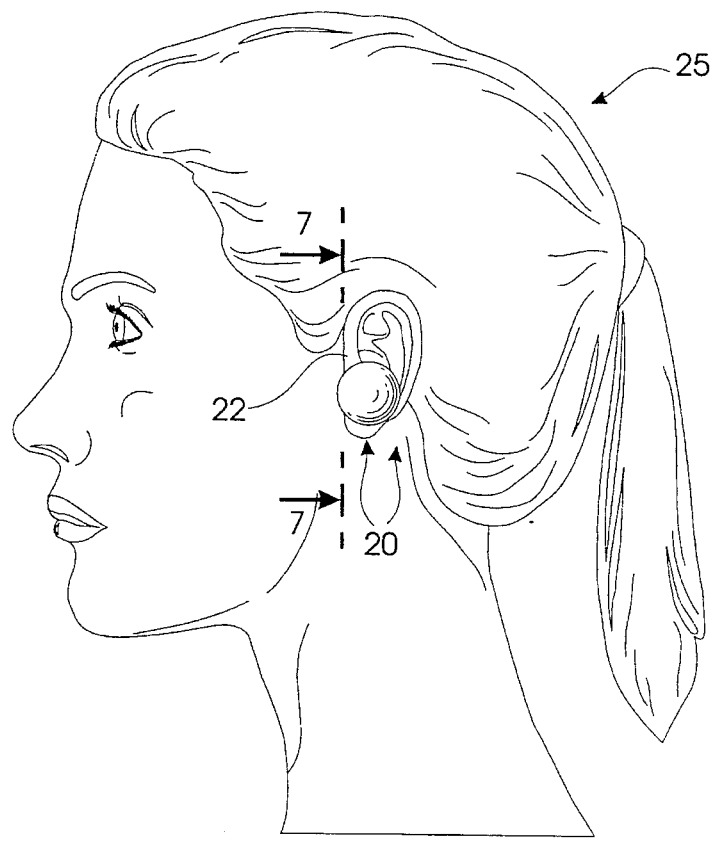
FIG. 1 is a pictorial view showing a wearer and the best mode of my hearing aid, wherein it is suspended adjacent the wearer's ear and disguised as an earring.
Figure 2:
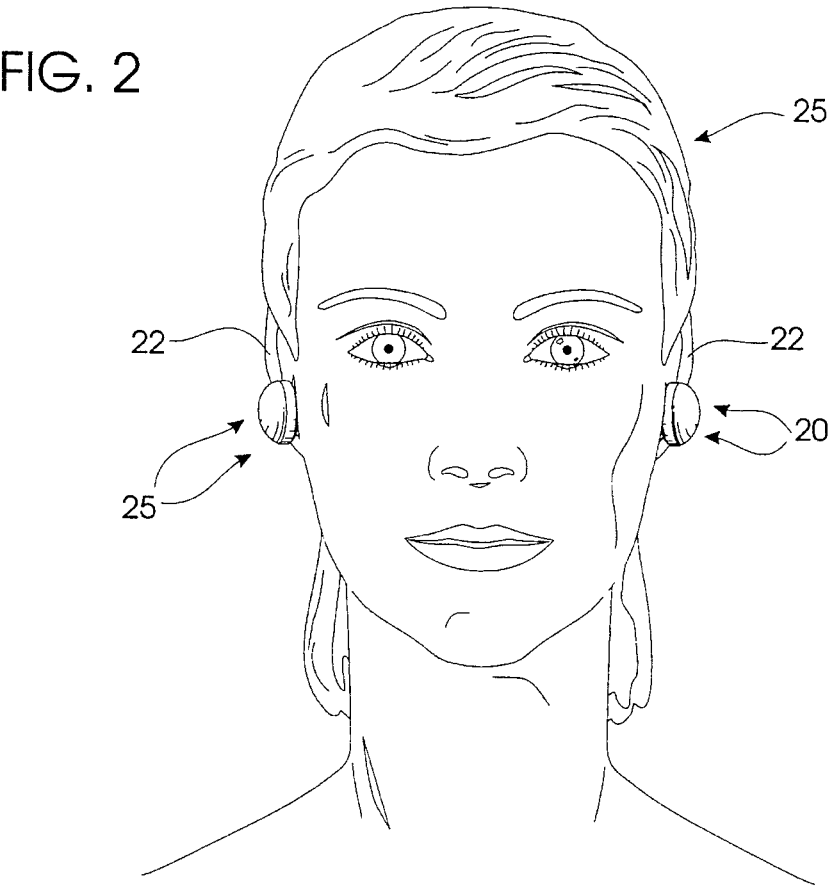
FIG. 2 is a pictorial view of the face of the wearer of FIG. 1, showing a pair of the hearing aids.
Figure 3:
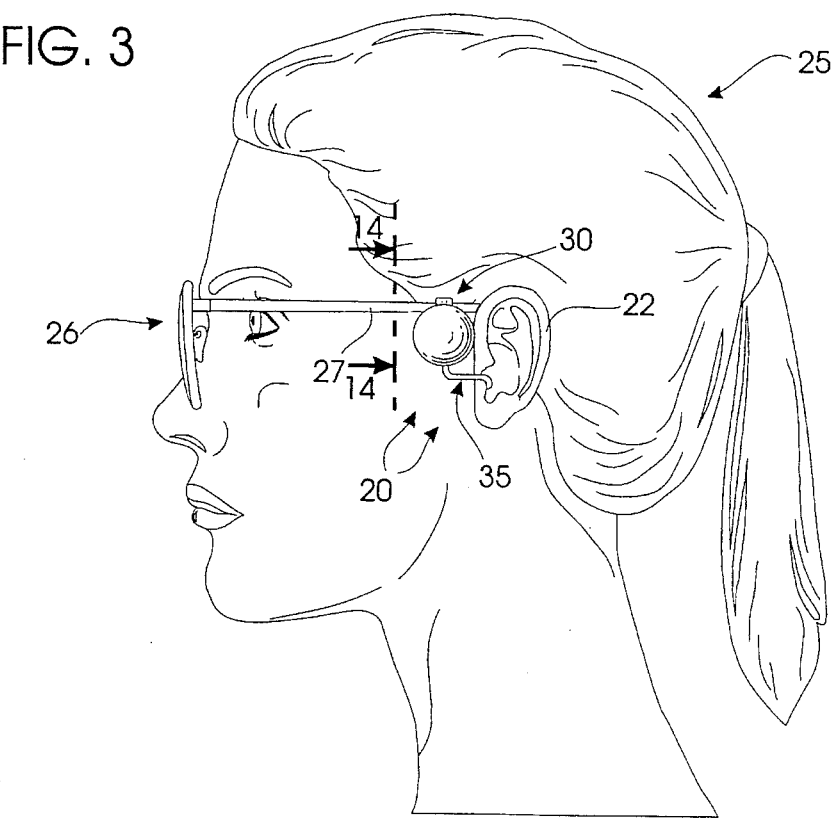
FIG. 3 is a pictorial view similar to FIG. 1 showing the hearing aid used with eyeglasses.
Figure 4:
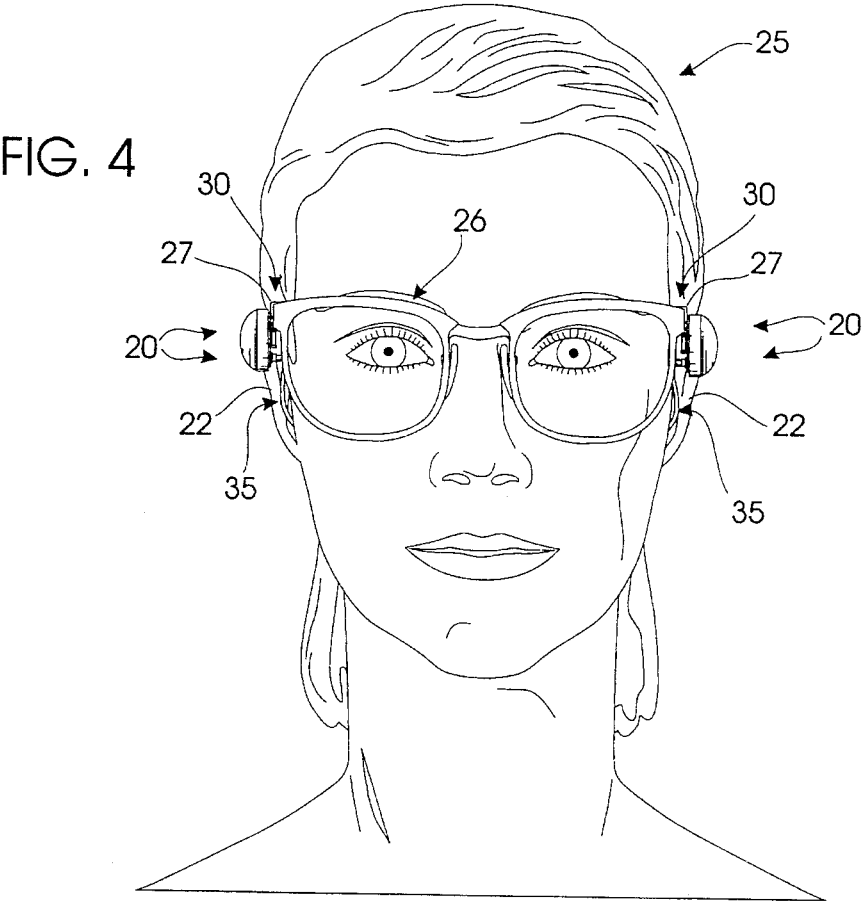
FIG. 4 is a pictorial view similar to FIG. 2 showing both eyeglass temples.

Referring more specifically to the drawings, my improved hearing aid thereshown is broadly designated by the reference numeral 20. As can be seen in FIGS. 1 and 2, the hearing aid 20 may be worn as an earring to disguise it from the casual observer. When worn as an earring, the hearing aid 20 may be affixed or mounted in the ear 22 of the wearer 25. Importantly, the wearer may alternatively affix the hearing aid 20 to a pair of glasses 26, as seen in FIGS. 3 and 4.

In an alternative embodiment of my invention, the hearing aid 20 is used solely as an earring (FIGS. 5–7). When used in this embodiment, the hearing aid 20 does not contain means for being affixed to a pair of glasses. The hearing aid 20 is suspended from the ear 22 by an ear mold 23. The ear mold 23 also conducts sound from the hearing aid 20 into the external acoustic meatus 24 of the ear 22. The ear mold 23 is lodged inside the meatus walls 24A of the ear 22 by the ear mold outer annulus 23A (FIG. 7). Current hearing aid practice requires that each ear mold be individually fitted to each wearer 25 so that the outer annulus 23A fits exactly within the walls 24A. An inner, resilient shaft 23B connects the ear mold 23 to the hearing aid 20 and conducts the sound from the hearing aid 20 into the meatus 24.

Figure 8:
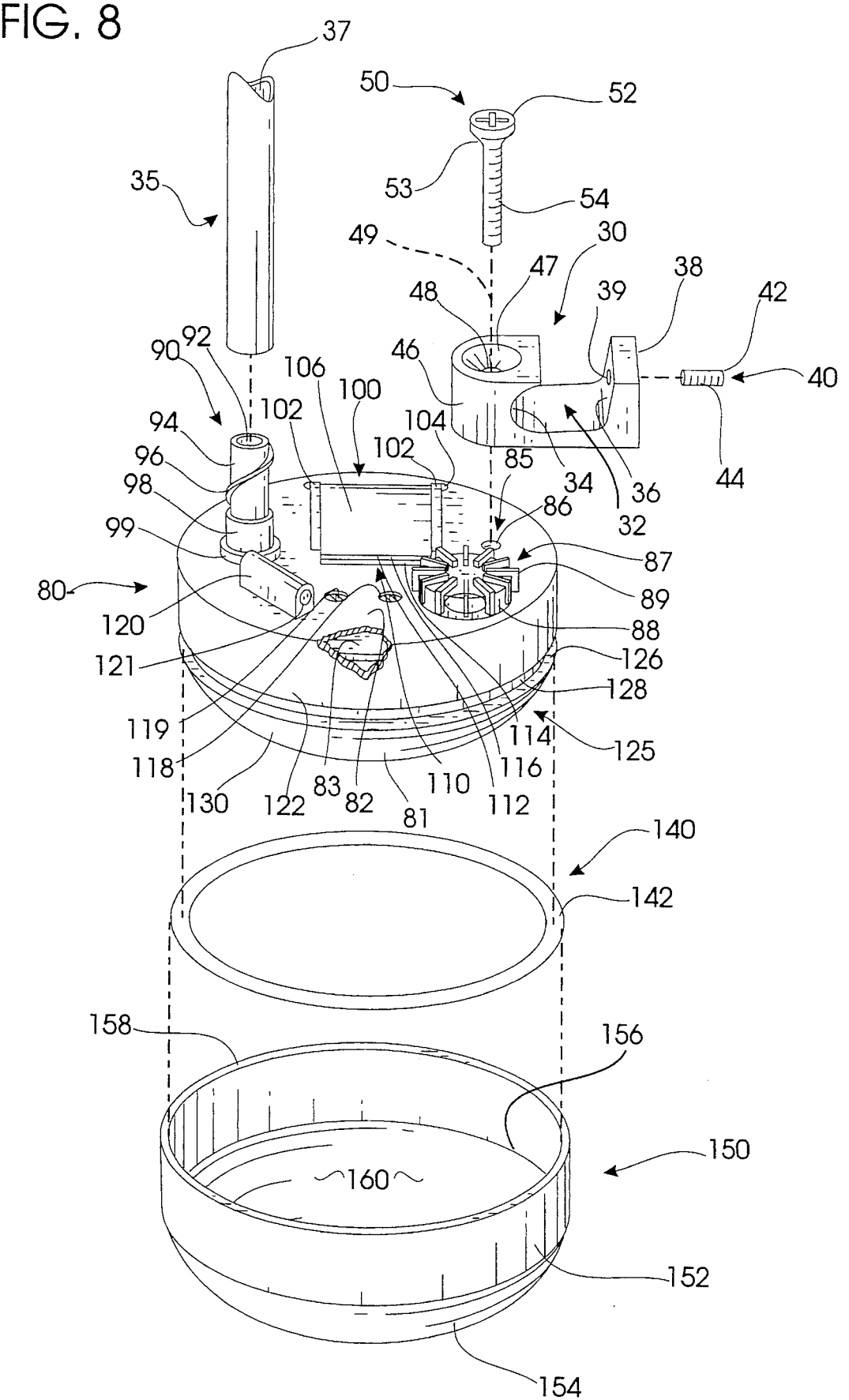
FIG. 8 is a partially fragmented, exploded isometric view of the best mode of the hearing aid, with pieces thereof omitted for clarity.
Figure 9:
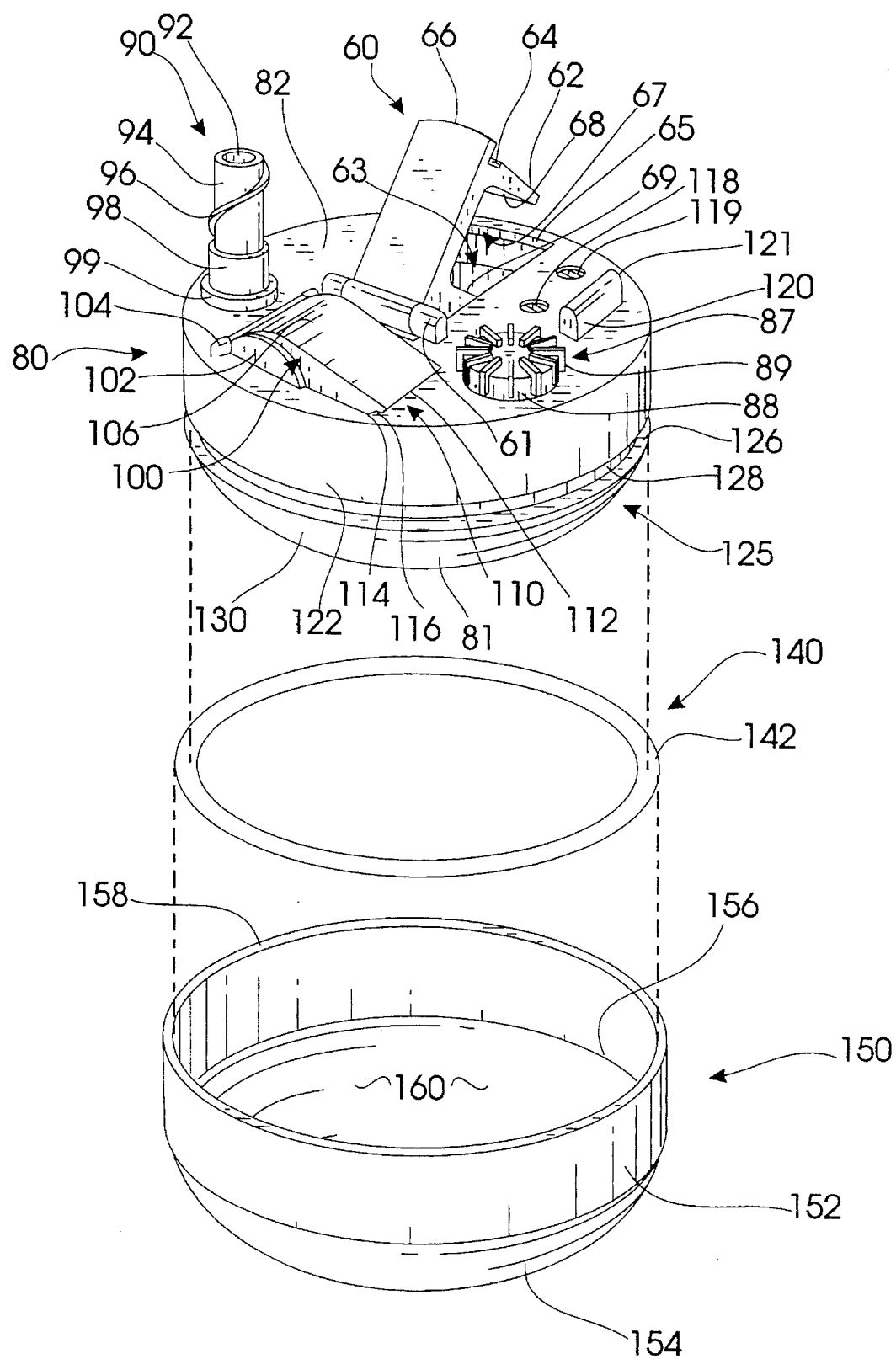
FIG. 9 is an exploded isometric view of a second preferred embodiment of my hearing aid.

In the preferred embodiments of my invention, the hearing aid 20 optionally, temporarily mounts upon the eyeglasses 26 by gripping, clasping or clipping to the eyeglass temples or frame 26 (FIGS. 8–12). The hearing aid 20 attaches to the glasses frame or temples 27 by substantially encircling the temple 27 and tightening thereon (FIG. 8).

In a first preferred embodiment of my invention, a preferred clasp 30 facilitates the fastening of the hearing aid 20 to the temple 27. Of course, the clasp 30 could easily be replaced by a roach clip or similar apparatus. A channel 32 penetrates the clasp 30. An arcuate lower lip 34 and a spaced apart upper edge or foot 36 define the channel 32. The clasp 30 has an exterior edge 38 on foot 36 which is spaced apart therefrom and penetrated by an orifice 39 that extends therethrough. The orifice 39 receives a set screw 40. Preferably, the set screw 40 has a hexagonal head 42 and several raised threads 44. The raised threads 44 permit tightening of the set screw 40 to secure or fasten the hearing aid 20 to the eyeglass temples 27 (as can best be seen in FIG. 14).

The arcuate lip 34 is contained within the clasp end or hub 46. The clasp hub 46 is penetrated by an orifice 48 that has a beveled inner lip 47. A screw 50 penetrates orifice 48 to rotatably fasten the clasp 30 to the hearing aid 20 (FIG. 15). The hub 46 rotates about axis of rotation 49 (FIG. 8) established by screw 50 between an employed position and a retracted position. Axis 49 is normal to the rear surface of the hearing aid casing. When the clasp 30 is employed, it grasps the eyeglasses in channel 32. The clasp 30 is rendered inoperative by rotating it behind the earring 20 where it is hidden from view in a retracted position. In this position, the hearing aid 20 may be used as an earring by simply suspending it from the ear 22 by using the ear mold 23. Preferably, the screw 50 has a Phillips head 52 and the screw shank 53 is progressively beveled to match the inner beveling of the beveled lip 47. The screw 50 also has a series of parallel raised threads 54 extending substantially along its longitudinal axis.

In a second preferred embodiment of my invention (seen in FIG. 9), a clip 60 temporarily attaches the hearing aid 20 to the eyeglass temple 27. The clip 60 rotates about hinge 61 from an inoperative, retracted or recessed position within the hearing aid 20 to clip onto the eyeglass temple 27. The axis of rotation established by the hinge is coplanar with the casing surface. Preferably, the clip is spring biased toward the retracted position. When the clip 60 is in the retracted position, the clip foot 62 resides completely within recess 63. An indentation 64 cooperates with a protrusion 65 to form a snap fitting latch when the clip 60 is closed. The latch and a spring or another biasing device (not shown) cooperatively retain the clip 60 in the recess 63. A protruding ledge 66 facilitates user manipulation of clip 60. A channel 67 is formed between the foot inner surface 68 and the inner surface of the hub 69. The channel 67 permits the insertion of the eyeglass temple 27 between the inner surfaces 68, 69. In use, the clip 60 captivates a portion of the temple 27 within the channel 67 to secure the hearing aid 20 to the temple 27. When used as an earring, the hearing aid 20 is suspended from the ear 22 by the ear mold 23.

Figure 10:
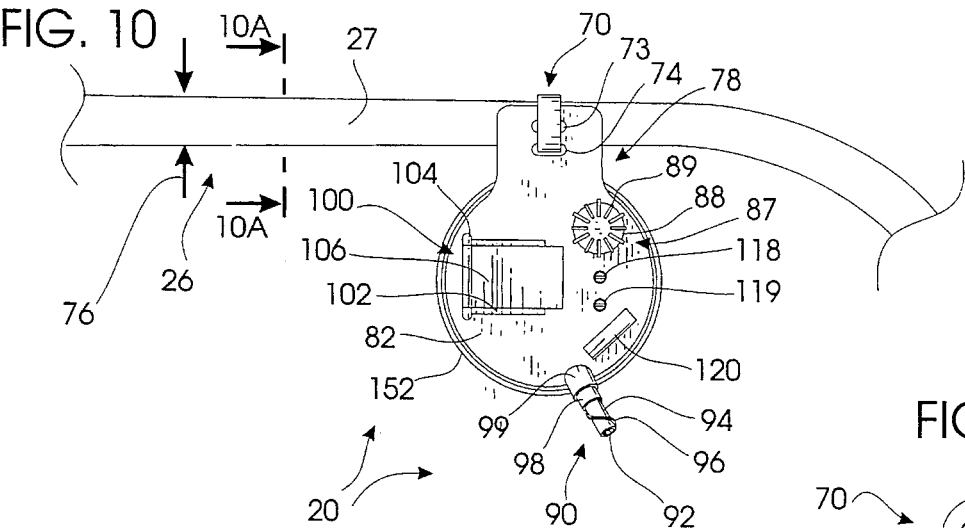
FIG. 10 is a rear elevational view of an alternative embodiment of the hearing aid showing the aid attached to the temple of a pair of eyeglasses by a cable tie.
Figure 10A:
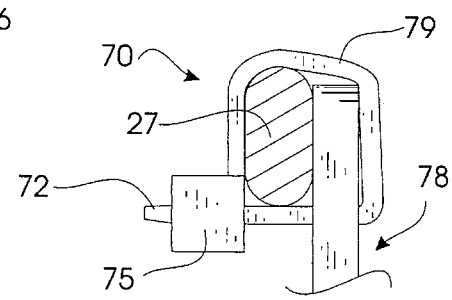
FIG. 10A is an enlarged fragmentary sectional view taken generally along line 10A—10A of FIG. 10.

In a third preferred embodiment of my invention (seen in FIGS. 10 and 11), a disposable cable tie 70 encircles the temple 27 and captivates it within the inner, generally circular channel 71 bounded by the cable tie body 79. A foot 72 is threaded through one of a pair of slots 73, 74 and inserted into locking hub 75 to define encircling channel 71. Each temple 27 is inserted into a channel 71 and the foot 72 is drawn through the hub 75 to snugly secure the hearing aid 20 to the temple 27. The cable tie 70 facilitates the quick attachment of the hearing aid 20 to a pair of glasses 26. The width accommodating slots 73, 74 are defined in a tab 78 extending from the rear surface of the hearing aid 20. Slot 73 or 74 is selected depending upon the temple dimensions (i.e., width 76 in FIG. 10). When the cable tie is properly selected and tightened, a firm, coplanar relationship between the abutting structures 27, 78 is maintained (FIG. 10A). Additionally, when the wearer 25 desires to use the hearing aid 20 as an earring, the slots 73, 74 facilitate the attachment of additional, suspended ornaments to permit the wearer to discriminatingly choose the desired "look" to fit the occasion.

To convert the attachment from the eyeglasses to the earring, the user need only sever the cable tie 70 in order to render it inoperative and then retract and remove it for disposal. The hearing aid 20 may then be suspended from the ear 22 by simply using the ear mold 23. A new cable tie 70 can be reinserted into one of the slots 73, 74 to reattach the hearing aid 20 to the eyeglasses 26 by captivating a portion of the temple 27 (FIG. 10).

In all of the embodiments of my invention, the hearing aid 20 appearance and its principle features are substantially the same. The hearing aid 20 comprises a housing or casing 80 substantially covered by an ornamental exterior shell 150. The casing 80 has a front surface 81 covered by the shell 150 and an exposed rear surface 82. A desired conventional amplifying circuit 83 and power supply are housed inside the casing 80 (FIG. 8). In the preferred embodiment, the screw 50 threadably engages an orifice 85 penetrating the housing rear surface 82. Preferably, the orifice 85 has receiving threads 86 formed therein. A volume control knob 87, sound jack 90, battery access door 100, a pair of tone controls 118, 119 and a pickup microphone 120 protrude from the rear surface 82. The volume control knob 87 protrudes perpendicularly from the rear surface 82. The knob 87 turns the hearing aid on and facilitates manual adjustment of the hearing aid volume output. The volume control knob 87 comprises an annular disc 88 intersected by several regularly spaced finger grips 89. The finger grips 89 facilitate manipulation of the volume control knob 87 by the user 25.

Figure 11:
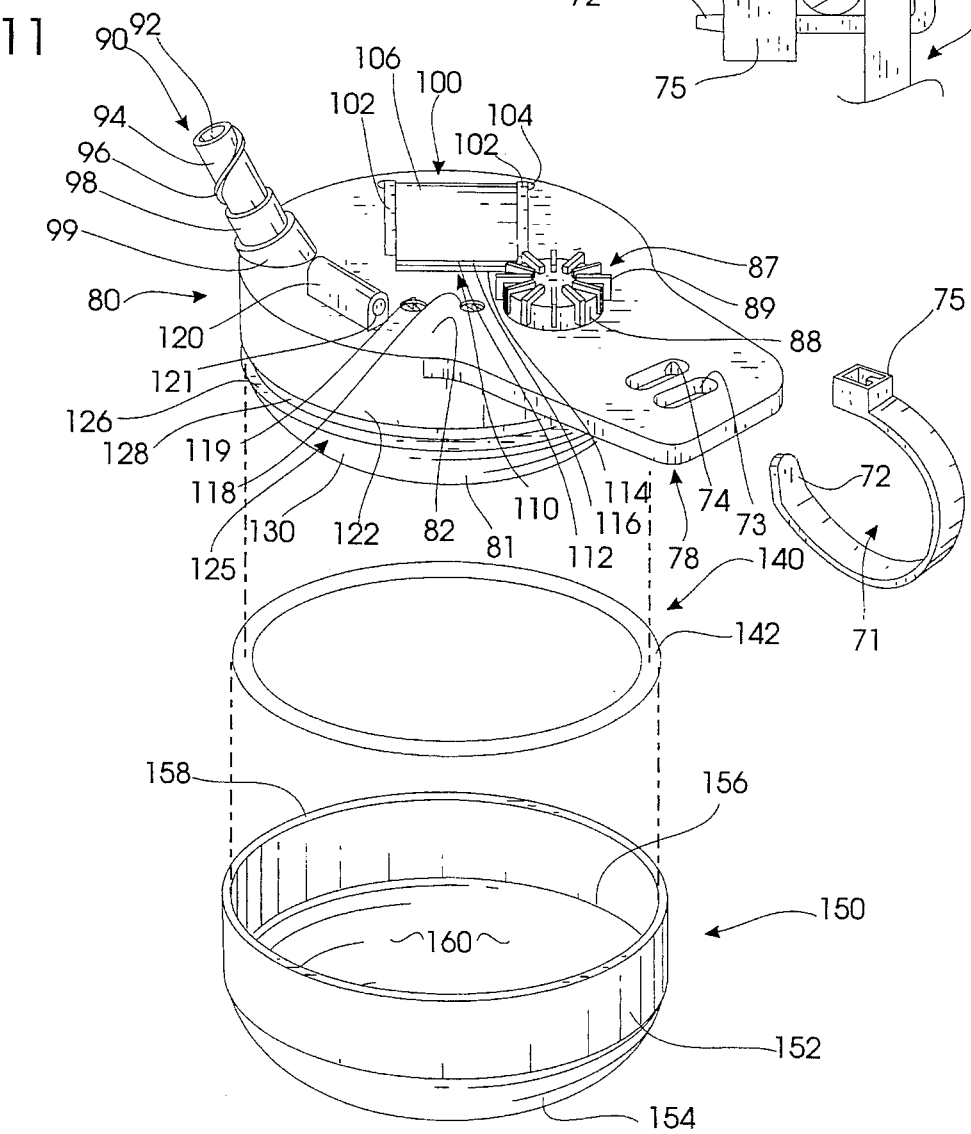
FIG. 11 is an exploded isometric view of the alternative embodiment of the hearing aid shown in FIG. 10.
Figure 18:
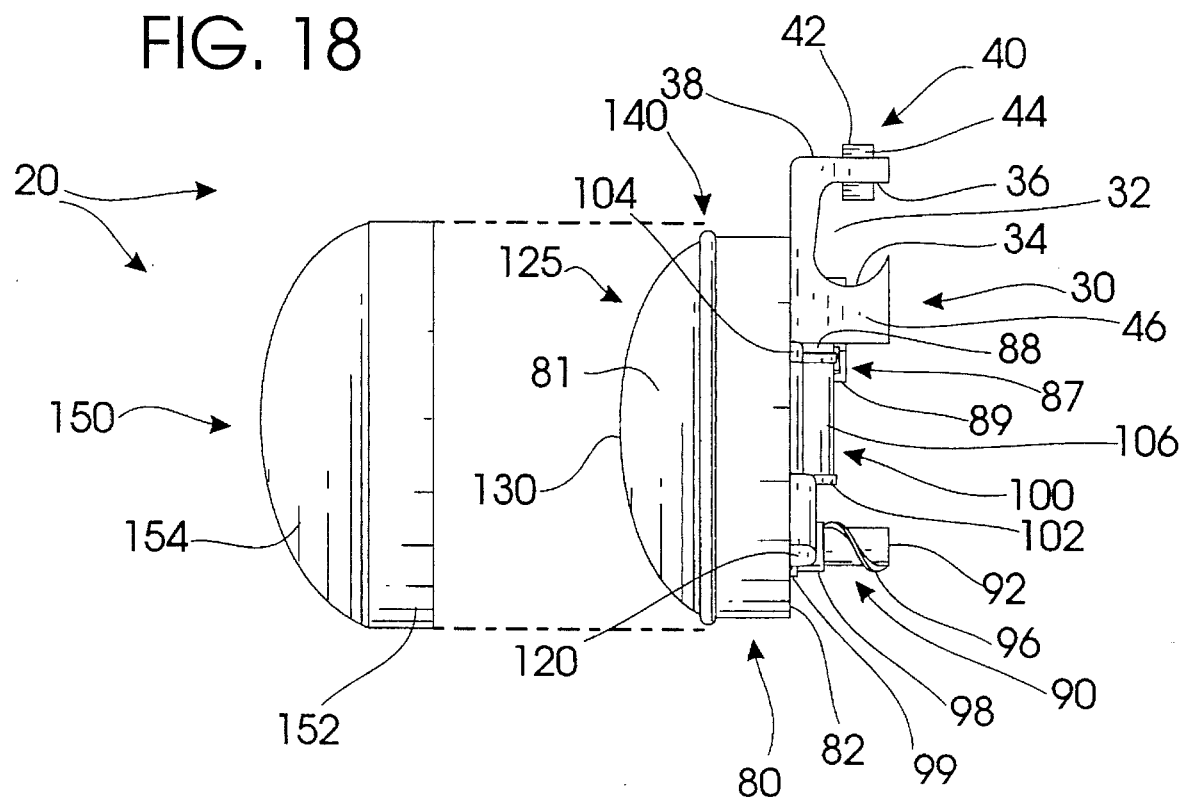
FIG. 18 is a partially exploded, right side elevational view of the hearing aid of FIG. 8; and, FIG. 19 is an elevational view of the concave interior of the ornamental outer shell.
Figure 19:
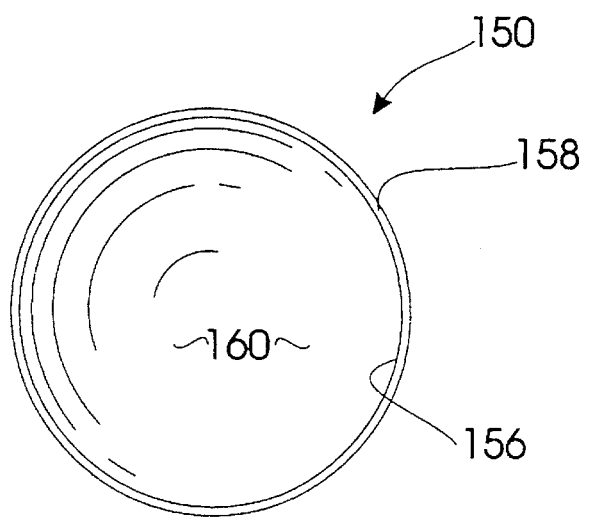

The hearing aid 20 transmits output through a sound jack 90 either directly into an ear mold 23 (FIGS. 1, 2, and 5–7) when the hearing aid 20 is used as an earring or via a transmission tube 35 (FIG. 8) that connects to the ear mold 23 when the hearing aid 20 is used with glasses 26. As can be seen in FIGS. 10–12, the angle of the sound jack 90 to the rear surface 82 is not required to be ninety degrees. The sound jack 90 comprises a projecting transmission orifice 92 surrounded by a tubular conduit 94. A singular spiral thread 96 facilitates the self-tapping insertion of the ear piece 23 or the transmission tube 35 onto the sound jack 90. A keeper 98 having the same overall diameter as the ear mold interior or the transmission tube's inner resilient shaft 37 maintains the connection. A stop 99 having an overall diameter equal to the respective outer diameters of the attached ear mold 23 or transmission tube 35 insures the proper alignment of the ear mold 23 or the transmission tube 35.

The battery access door 100 permits the user 25 to service or replace the hearing aid battery (not shown). A pair of plates 102, which provide electrical connection to the battery and serve as retention means for the battery, define the interior of the battery housing. A hinge 104 permits the rotatable movement of the battery door 100. The curved, exterior battery door surface 106 extends convexly from the hinge 104 to a forward end 110. The battery door forward end 110 comprises a pair of spaced apart parallel, raised ledges 112, 114 that are divided by an indentation 116. Ledge 114 is slightly smaller than ledge 112 and ledge 114 serves as a latch for the battery door 100. Indentation 116 facilitates user manipulation of the battery door 100.

A pair of tone controls 118 and 119 are defined in the rear surface 82. The pickup microphone 120 also protrudes from the rear surface 82. A reception orifice 121 is formed at one end of the pickup microphone 120.

An annular ring 122 forms the exterior side of the casing 80. The ring 122 extends from the rear surface 82 and is circumscribed at its opposite end by a channel or groove 125. A convex cap 130 attaches adjacent the groove 125.

The groove 125 comprises an indented flat base 128 defined between a pair of spaced apart perpendicular walls 126. The ring groove 125 seats an elastomeric O-ring 140. The O-ring 140 snap fits and secures the hollow, ornamental outer shell 150 to the casing 80.

The outer shell 150 covers all of the casing 80 except the rear surface 82. In use, the rear surface 82 is adjacent the wearer's ear and therefore it is not visible to the casual observer. Thus, the hearing aid 20 is cosmetically disguised or camouflaged from observers.

The shell 150 comprises an annular ring or skirt 152 capped by a convex top 154. The shell skirt 154 has a slightly larger diameter than the housing annular ring 122 and the O-ring 140. The shell 150 fits over the housing annular ring 122 until the O-ring 140 hits a stop 156. The stop 156 is at the intersection of the skirt 152 and the top 154. When the shell 150 is properly placed, the plane established by the shell end 158 is flush with the rear surface 82. The O-ring diameter 142 is slightly larger than the shell interior diameter at stop 156. Therefore, when the shell 150 slides over the casing 80, the O-ring 140 compresses slightly. This compression securely holds the shell 150 in place. The shell 150 may be easily removed by simply pulling it off of the casing 80. The interior surface 160 of the top 154 is adjacent to the casing front surface 81.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A cosmetically disguised ornamental hearing aid comprising:

means for amplifying sound;

a casing for housing said means for amplifying sound, said casing having a front surface projecting away from a wearer and a rear surface projecting towards the wearer;

a decorative, removable, hollow shell snap fitted to said casing to cover said front surface;

a concealed sound jack projecting from said casing rear surface towards the ear of the wearer; and, clasp means projecting from said rear surface for attaching said hearing aid to an eyeglass temple, said clasp means movable between a first position engaging said eyeglass frame and an inoperative, concealed position proximate said rear surface and unattached to said eyeglass temple, said clasp means comprising a rotatable hub pivoted to said casing rear surface, an integral spaced apart foot, and a channel formed between said hub and said foot in which a portion of said eyeglass frame may be captivated.

2. The hearing aid as defined in claim 1 further comprising means defined in said foot for temporarily securing said clasp means to said eyeglass temple by gripping a portion of said eyeglass.

3. The hearing aid as defined in claim 2 further comprising means for transmitting sound output from the casing to the ear of the wearer, said last mentioned means comprising:

a threaded tubular projection extending from said casing;

a resilient shaft threadably coupled to said projection, said shaft extending to a custom ear mold disposed within the ear canal.

4. The hearing aid as defined in claim 1 wherein said casing is hemispherical and disguises at least half of said hearing aid.

5. The hearing aid as defined in claim 1 wherein said foot is snap fitted within a recess in said casing when said clasp means is in said inoperative position.

6. A cosmetically disguised ornamental hearing aid comprising:

circuit means for amplifying sounds;

a casing for housing said circuit means, said casing having a front surface projecting away from a wearer, a rear surface projecting towards the wearer, a periphery defined between said front and rear surfaces, and an annular groove defined in said periphery;

a decorative, removable, hollow shell snap fitted to said casing to cover said front surface, said shell having a skirt portion engaging said casing periphery;

resilient O-ring means circumscribing said casing and disposed within said groove for selectively coupling said shell to said casing;

rotatable clasp means projecting from said rear surface for attaching said hearing aid to an eyeglass frame, said clasp means rotatable between a first position engaging said eyeglass frame and a concealed, retracted position unattached to said eyeglass frame, said clasp means comprising a rotatable hub pivoted to said casing rear surface, an integral spaced apart foot, and a channel formed between said hub and said foot in which a temple of said eyeglass frame is captivated.

7. The hearing aid as defined in claim 6 wherein an axis of rotation of said clasp means is established perpendicularly to the rear surface of said casing.

8. The hearing aid as defined in claim 28 further comprising gripping means defined in said foot for attaching said clasp means to said eyeglass temple.

9. The hearing aid as defined in claim 8 further comprising means for transmitting sound output from the casing to the ear of the wearer, said last mentioned means comprising:

a tubular projection extending from said casing;

an external, spiral thread wound around said projection; and, a resilient shaft adapted to receive said thread to couple said last mentioned means to said projection.

10. The hearing aid as defined in claim 9 wherein said casing is hemispherical.

11. A cosmetically disguised ornamental hearing aid comprising:

circuit means for amplifying sounds;

a casing for housing said circuit means, said casing having a front surface projecting away from a wearer, a rear surface projecting towards the wearer, a periphery defined between said front and rear surfaces, and an annular groove defined in said periphery;

a decorative, removable, hollow shell snap fitted to said casing to cover said front surface, said shell having a skirt portion engaging said casing periphery; and, deflectable clasp means secured within said rear surface for attaching said hearing aid to an eyeglass frame, said clasp means deflectable between a first position engaging said eyeglass frame and a concealed, retracted position flushly recessed to said rear surface and unattached to said eyeglass frame, said clasp means comprising a rotatable hub pivoted to said casing rear surface, an integral spaced apart foot, and a channel formed between said hub and said foot in which a portion of said eyeglass frame is captivated.

12. The hearing aid as defined in claim 11 wherein said foot is snap fitted within a recess in said casing when said clasp means is retracted.

13. The hearing aid as defined in claim 12 wherein an axis of rotation of said clasp means is established coplanar with the rear surface of said casing.

14. The hearing aid as defined in claim 13 further comprising means for transmitting sound output from the casing to the ear of the wearer, said last mentioned means comprising:

a tubular projection extending from said casing;

an external, spiral thread wound around said projection; and, a resilient transmission tube adapted to receive said thread to couple said tube to said projection for conducting sound to an ear mold disposed within the ear canal.

15. The hearing aid as defined in claim 14 including resilient O-ring means circumscribing said casing and disposed within said groove for binding said shell to said casing.

16. The hearing aid as defined in claim 15 wherein said casing is hemispherical.

17. A cosmetically disguised ornamental hearing aid comprising:

an amplifying circuit;

a casing for housing said circuit, said casing having a front surface projecting away from a wearer and a rear surface projecting towards the wearer;

a tab integral with said casing that projects upwardly and away therefrom;

a decorative, removable, hollow shell snap fitted to said casing to cover said front surface;

a concealed sound jack projecting from said casing rear surface towards the ear of the wearer; and, cable tie means penetrating said tab for selectively affixing said hearing aid to eyeglass temples.

18. The hearing aid as defined in claim 17 wherein said tab comprises width accommodating slots for receiving said cable tie.

19. The hearing aid as defined in claim 18 wherein said tab and said temples are firmly maintained in coplanar abutting relation.

* * * * *